United States Patent Office 3,309,401
Patented Mar. 14, 1967

3,309,401
ALPHA-HYDROXYBORINIC ACIDS
Tillmon H. Pearson, Baton Rouge, La., assignor to Ethyl Corporation, New York, N.Y., a corporation of Virginia
No Drawing. Filed July 2, 1962, Ser. No. 207,056
12 Claims. (Cl. 260—500)

This invention relates to novel chemical compounds having utility in the chemical and allied arts, and to a method for their preparation.

In particular, this invention relates to novel alpha-hydroxyborinic acids and a novel and convenient method for their preparation.

An object of this invention is to provide new chemical compounds finding diverse utility in the art. Another object is to provide these compounds in high yields by an expeditious process. A more specific object is to provide alpha-hydroxyborinic acids of high purity and yields by an expeditious process. Other objects will be apparent from the ensuing description.

The above and other objects of this invention are accomplished by providing as new compositions of matter alpha-hydroxyborinic acids having the general formula

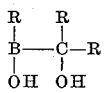

wherein the groups designated by R are hydrocarbon radicals each of which preferably contains up to about 18 carbon atoms. Hence the radicals of these new compounds can be any of the well-known hydrocarbon groups, such as alkyl, alkenyl, alkynyl, cycloalkyl, aryl, alkaryl, and aralkyl; especially those which contain up to about 18 carbon atoms. Hydrocarbon groups containing more than about 18 carbon atoms each are perfectly feasible as the resultant compounds also fulfill the objects of this invention. However, such higher molecular weight compounds are less preferable as they are somewhat more difficult to prepare and require the use of less abundant raw materials for their synthesis. In short, such higher molecular weight compounds afford no particular technical advantage over the above preferred compounds and are more costly. Nevertheless the principles of this invention do extend and apply to these equivalent higher molecular weight compounds.

A particularly preferred embodiment of this invention are those compounds wherein the hydrocarbon groups designated by R in the above formula are identical groups. Such alpha-hydroxyborinic acids are preferred since trihydrocarbonboranes having identical hydrocarbon groups employed in their preparation are the simplest to prepare by conventional procedures, such as hydroboration. Also preferred are those alpha-hydroxyborinic acids wherein the hydrocarbon groups designated by R in the above formula are alkyl groups since the corresponding trialkylboranes employed in their preparation are easily prepared from low cost, abundant raw materials and hence offer an economic advantage. The most preferred embodiment of the unique compounds of this invention are those wherein the groups designated by R supra are identical alkyl groups. This preference stems from the relative ease of preparing in high yield and purity the corresponding trialkylboranes employed in their preparation. For example, when employing as a starting material triethylborane which can be made in essentially quantitative yield by reacting diborane with ethylene in an appropriate ether solvent, the groups designated by R supra are ethyl groups.

Generally speaking, these novel compounds are prepared by reacting a trihydrocarbonborane with carbon monoxide in the presence of water. Whatever the reaction mechanism may be, the net effect is that two hydrocarbon groups become attached to a single carbon atom (presumably from the carbon monoxide), a hydroxyl group becomes attached to the boron atom, and another hydroxyl group becomes attached to the foregoing single carbon atom:

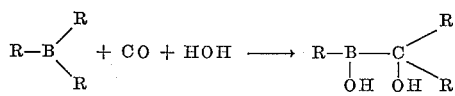

Therefore, the end result is that the three co-reactants combine in equimolar proportions in such a way as to produce new and exceedingly useful borinic acid derivatives.

As discussed above, trihydrocarbonboranes having less than 18 carbon atoms per hydrocarbon group are preferred. Hence, a preferred process for preparing the unique compounds of this invention comprises reacting a trihydrocarbonborane in which each hydrocarbon group contains up to about 18 carbon atoms with carbon monoxide in the presence of water. An even more preferred method of preparing these unique compounds comprises the use of trialkylboranes, especially those having identical alkyl groups, in the reaction discussed in the preceding paragraph.

The reaction proceeds smoothly at atmospheric pressure and room temperature. However, for reasons discussed hereinafter elevated pressures (i.e., pressures above about 500 pounds per square inch) are preferred. Where the trihydrocarbonborane exists as a viscous liquid or as a solid, it is desirably dissolved in a suitable solvent preparatory to its use in the instant process. Even where the trihydrocarbonborane is suitable for use without a solvent, it is generally preferred to employ such since it serves as a dispersing medium for the borane compound whereby the reaction occurs expeditiously and for other reasons which will come to light as the discussion proceeds.

A convenient procedure for conducting this reaction comprises charging the trihydrocarbonborane into a reaction vessel equipped with agitation means on containing an excess amount of deaerated water. The reaction vessel is then sealed and a high pressure source of carbon monoxide is injected into the liquid mass contained in the reactor. At pressures above 500 pounds per square inch, particularly around 2000 pounds per square inch, the reaction proceeds very smoothly and readily, requiring about 1½ to 2 hours at room temperature for complete conversion of the trihydrocarbonborane. The reaction is moderated by the presence of the water, hence only a small temperature kick, usually about several degrees, is noted. This result is advantageous in achieving the objects of this invention because isomerization of the end product is avoided.

The reaction system produced by the above reaction generally comprises two liquid phases, the bottom phase being water and the upper phase being the novel compounds forming the subject of this invention. In general, these novel compounds are characterized as clear liquids having a density less than that of water and are soluble in organic solvents. They are further characterized as being stable but are readily oxidized and dehydrated. Additionally, they can be hydrolyzed by an alkali to prepare other unique compounds.

Typical of the unique compounds prepared pursuant to this process are: methyl(2-hydroxy-2-propyl)borinic acid, methyl(2-hydroxy-2-butyl)borinic acid, methyl(2-hydroxy-3-methyl-2-butyl)borinic acid, methyl(3-hydroxy-3-pentyl)borinic acid, methyl(3-hydroxy-3-hexyl)borinic acid, methyl(2-hydroxy-2-hexyl)borinic acid, methyl(2-hydroxy-4-methyl-2-pentyl)borinic acid, methyl(2-hydroxy-3-methyl-2-pentyl)borinic acid, methyl(2-hydroxy-3,3-dimethyl-2-butyl)borinic acid, 4-bromobutyl(2-hydroxy-2-propyl)borinic acid, methoxymethyl(2-hydroxy-1-methoxy-2-propyl)borinic acid, ethyl(2-hydroxy-2-butyl)borinic acid, ethyl(2-hydroxy-2-pentyl)borinic acid, ethyl(3-hydroxy-3-pentyl)borinic acid, ethyl(3-hydroxy-3-hexyl)borinic acid, propyl(2-hydroxy-2-propyl)borinic acid, propyl(4-hydroxy-4-heptyl)borinic acid, 2-propyl-(3-hydroxy-2,4-dimethyl-3-pentyl)borinic acid, 2-methyl-propyl(4-hydroxy-2,6-dimethyl-4-heptyl)borinic acid, butyl(5-hydroxy-5-nonyl)borinic acid, pentyl(2-hydroxy-2-butyl)borinic acid, pentyl(6-hydroxy-6-hendecyl)borinic acid, hexyl(7-hydroxy-7-tridecyl)borinic acid, decyl(5-hydroxy-2-methyl-3-ethyl-5-decyl)borinic acid, docosanyl-(11-hydroxy-11-heneicosyl)borinic acid, butenyl(3-hydroxy-3-butyl)borinic acid, cyclohexyl(dicyclohexylhydroxymethyl)borinic acid, methyl(1-hydroxy-1-benzylethyl)borinic acid, benzyl(2-hydroxy-1,3-dibenzyl-2-propyl)borinic acid, and the like.

The above compounds and their method of preparation are exemplified by the following examples, wherein all parts and percentages are by weight.

*Example I*

A reaction vessel equipped with a means for agitation was charged with 50 parts of triethylborane and 50 parts of deaerated water. The vessel was then sealed and the agitation set into operation. While the contents of the vessel were continuously agitated, carbon monoxide was injected into the liquid mass within the reactor until a pressure of approximately 1000 pounds per square inch was attained. After about 45 minutes, the pressure was noted to have dropped to 790 pounds per square inch whereupon pressure in the reactor was adjusted upward to 1350 pounds per square inch by the further addition of carbon monoxide. After an additional 45 minutes the pressure in the reactor was noted to have fallen to 1230 pounds per square inch. Again, the pressure was adjusted upward, this time to 1660 pounds per square inch. After about 30 minutes the pressure in the reactor was noted to be holding fairly constant at approximately 1640 pounds per square inch. This indicated that the reaction was essentially complete whereupon agitation was discontinued. The contents of the reactor were allowed to stand for a short period of time to phase separate into layers. The lower layer was found to be an aqueous layer and the upper layer was a clear liquid product. The clear liquid product was analyzed and found to be ethyl(3-hydroxy-3-pentyl)borinic acid of very high purity having the formula:

```
      CH₃  CH₃
       |    |
      CH₂  CH₂
       |    |
      B————C—CH₂—CH₃
       |    |
      OH   OH
```

To illustrate the diverse uses of the above compound, a portion of the liquid ethyl(3-hydroxy-3-pentyl)borinic acid prepared by way of the above example was distilled at reduced pressure to yield 2,3,3,5,6,6-hexaethyl-1,4-dioxa-2,5-diboracyclohexane. In the reaction formula shown below this material is represented by (A). Another portion of the borinic acid prepared by way of Example I was oxidized by reacting first with an aqueous alkali, and then with hydrogen peroxide to give a high yield of 3-pentanone as represented by (B) in the below formula. Another portion of the borinic acid was reacted with 20 percent aqueous alkali to give a quantitative yield of pentanol-2 as represented by (C) in the formula below.

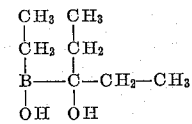

Repetition of the procedure of Example I utilizing in one instance trioctylborane and in another instance tri-3-butenylborane instead of the triethylborane yields octyl(9-hydroxy-9-heptadecyl)borinic acid and 3-butenyl(5-hydroxy-5-1,8-nonadienyl)borinic acid respectively.

*Example II*

A reaction vessel was charged with 18 parts of triisobutylborane and 25 parts of deaerated water. The reactor was then sealed and a quantity of high pressure carbon monoxide sufficient to raise the pressure in the reactor to 2100 pounds per square inch was injected into the reactor. After about 2 hours the pressure in the reactor leveled out to approximately 1800 pounds per square inch. The reaction products were then removed from the reactor and found to comprise two liquid phases, the bottom phase containing a slush of a white solid. The upper phase was separated from the lower phase containing the white solid. Upon analysis the upper phase was found to be 2-methylpropyl(4-hydoxy-2,6-dimethyl-4-heptyl)borinic acid (40 percent yield) having the formula:

```
          CH₃   CH₃
           |     |
     CH₃—CH   CH—CH₃
           |     |
          CH₂   CH₂        CH₂
           |     |          |
          B————C————CH₂—CH—CH₃
           |     |
          OH   OH
```

To illustrate the diverse uses of this unique borinic acid, a portion thereof was dehydrated by subjection to vacuum whereby a white solid having a melting point of 139–140.5° C. was obtained. Upon analysis, this dehydrated material was found to be 2,3,3,5,6,6-hexaisobutyl-1,4-dioxa-2,5-diboracyclohexane identified as (A) in the reaction sequence presented above. Another portion of this unique borinic acid was oxidized and hydrolyzed to give diisobutylketone and diisobutylcarbinol respectively by refluxing the borinic acid with excess hydrogen peroxide in aqueous alkali to which ethanol was added. A high yield of diisobutylketone as represented by (B) and diisobutylcarbinol as represented by (C) in the above equations was obtained.

Substitution of tridodecylborane and of triphenylborane in the above procedure gives dodecyl(13-hydroxy-13-pentacosyl)borinic acid and phenyl(diphenylhydroxymethyl) borinic acid respectively.

*Example III*

In this instance, the trihydrocarbonborane was prepared in situ by dissolving 10 parts of hexene-1 in 38 parts of dimethyl ether of diethylene glycol. This mixture was then hydroborated by adding 1 part of sodium borohydride followed by the addition of 6 parts of boron trifluoride etherate. The resulting mixture of tri-n-hexylborane and dimethyl ether of diethylene glycol was then charged into a reactor containing 50 parts of freshly deaerated water. The reactor was sealed and a quantity of high pressure carbon monoxide sufficient to produce a pressure of 2000 pounds per square inch was injected into the liquid mass in the reactor, said mass being at room temperature. After approximately 6 hours it was noted that the pressure had leveled out to 1800 pounds per square inch. This signified that the reaction was essentially complete. Upon allowing to stand, the contents of the reactor comprised two phases, the top layer being the desired product. The product, which had an oily appearance, was analyzed and found to be n-hexy(7-hydroxy-7-tridecyl)borinic acid existing in essentially quantitative yield having the formula:

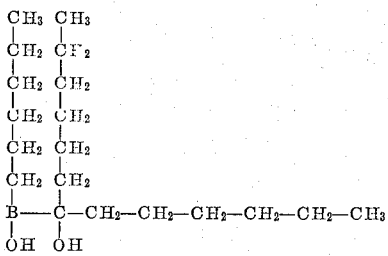

The commercial versatility of this unique borinic acid was illustrated by dehydrating a portion thereof to 2,3,3,5,6,6 - hexahexyl-1,4-dioxa-2,5-diboracyclohexane having the general formula (A) shown in the reaction formula above. Another quantity of this unique borinic acid was oxidized to give tridecanone-7 having the general formula (B) as shown above. Yet another portion was hydrolyzed to yield tridecanol-7 which had the general formula (C) set forth above. Still another use of this unique borinic acid was its conversion to a borinic anhydride.

Following the above procedure, substitution of trioctadecylborane and tristyrylborane yields octadecyl(19-hydroxy-19-heptatriacontyl)borinic acid and styryl(distyrylhydroxymethyl)borinic acid respectively.

*Example IV*

Ten parts of cyclohexene was dissolved in 38 parts of dimethyl ether of diethylene glycol. This mixture was then hydroborated by adding 1 part of sodium borohydride followed by the addition of 5 parts of boron trifluoride etherate. The resulting solution comprised tricyclohexylborane dissolved in dimethyl ether of diethylene glycol. The solution was then charged into a reaction vessel equipped with means for agitation and containing 50 parts of deaerated water. The reactor was sealed and the contents agitated. A quantity of carbon monoxide sufficient to produce a pressure within the reactor of 2050 pounds per square inch was injected into the agitated contents of the reactor. After approximately 6 hours the pressure in the reactor was noted to have fallen to 1700 pounds per square inch. Agitation was terminated and upon standing, the resultant mixture in the reactor separated into two separate phases. The upper phase was the desired end product and upon analysis was found to be cyclohexyl(dicyclohexylhydroxymethyl)borinic acid:

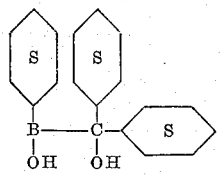

[The letter S designates that the ring is saturated.]

The versatility of this unique borinic acid was demonstrated by hydrolyzing it by refluxing with 10 percent aqueous alkali to yield dicyclohexylcarbinol having the general formula (C) as above.

Employing trieicosylborane and tricumenylborane in the procedure of the above examples results in eicosyl(21-hydroxy-21-hentetracontyl)borinic acid and cumenyl(dicumenylhydroxymethyl) borinic acid respectively.

The trihydrocarbonborane employed in the process of this invention has the general formula

wherein the groups designated by R preferably contain up to about 18 carbon atoms each and are selected from the group consisting of alkyl, alkenyl, alkynyl, cycloalkyl, aryl, alkaryl, and aralkyl radicals. The above radicals may be substituted with functional groups which do not interfere with the desired reaction, such as halogen, nitrosyl, carbonyl, ester, ether, and like inert groups. Trialkylboranes, especially those in which the individual alkyl groups are the same are particularly preferred.

Exemplary of the trihydrocarbonborane compounds that can be employed are trimethylborane, triethylborane, tri-n-propylborane, triisopropylborane, tri-n-butylborane, tri-sec-butylborane, triisobutylborane, tri-3-methylbutylborane, tripentylborane, tri-4-methylpentylborane, trihexylborane, trioctylborane, tridecylborane, triundecylborane, tridodecylborane, trioctadecylborane, trieicosylborane, tridocosylborane, tritriacontylborane, tritetracontylborane, tripentacontylborane, tri(4 - bromobutyl) borane, methylethyl(2 - chloroethyl)borane, methyldi (methoxymethyl)borane, dimethylcarbomethoxymethylborane, the trialkylborane obtained by hydroborating methyl oleate, tri(3-ketobutyl)borane, methyldiethylborane, ethyldimethylborane, diethylpropylborane, methylethylpropylborane, pentyldecyldocosylborane, decyleicosyltriacontylborane, tri-3-butenylborane, butenylpentenylhexenylborane, methylbutenylpentenylborane, methylethylhexenylborane, tricyclopentenylborane, tricyclohexenylborane, cyclopentyldicyclohexylborane, ethylbutenylcyclopentylborane, tribenzylborane, tristyrylborane, tricumenylborane, benzyldistyrylborane, benzylstyrylpropylborane, dimethylbenzylborane, methylbutenylbenzylborane, ethylpentynylbenzylborane, cyclopentyl-3-methylbenzyl-4-methylstyrylborane, and the like.

The above compounds and their method of preparation are well known in the art. One method for their preparation comprises the reaction of a dialkyl metal compound with a trialkyl borate whereby the corresponding trialkylborane is realized. Another method for the synthesis of trihydrocarbonboranes comprises the reaction of an organometallic derivative with a borate ester or a boron halide, particularly the reaction of the corresponding Grignard reagent with boron trifluoride-etherate. Another very suitable method to prepare many of the above compounds is by hydroboration which comprises the reaction of diborane with an olefin to produce the corresponding trihydrocarbonborane. As mentioned earlier, it is highly desirable to employ a trihydrocarbonborane of high purity which is manifested in the yield and purity of the end product. To further insure a high purity source of the trihydrocarbonborane by the latter technique, the diborane can be generated in situ whereby it immediately reacts with the olefin without having the opportunity to become contaminated. Hence, a preferred method of preparing many of the above trihydrocarbonboranes, especially the trialkylboranes, is by reacting sodium borohydride with boron trifluoride in a suitable solvent containing a dissolved olefin. In this manner, diborane is generated in situ which further reacts with the dissolved olefin to produce the corresponding trihydrocarbonborane. Suitable solvents are dimethylether of diethylene glycol, dimethyl ether of triethylene glycol, and the like such as discussed hereinafter.

The trihydrocarbonborane can be employed in the present process in its pure state when it exists as a liquid unless it is too viscous or is a solid whereby it can be dissolved in a suitable solvent. It is understood that if the trihydrocarbonborane is a solid at standard conditions, then in many instances it can be melted prior to its use and employed in its pure state without employing a solvent. However, it is preferred to employ the trihydrocarbonborane as dissolved in a solvent where such is a necessary adjunct for its preparation for several reasons, especially when a trialkylborane is employed as prepared by the latter hydroboration technique mentioned above. First, the solvent serves as a dispersing medium for the trihydrocarbonborane whereby the reaction occurs expeditiously and efficiently. Second, in the preferred method of preparing the trihydrocarbonborane, namely by hydroboration, the borane as prepared is dissolved in a solvent and hence, the entire mixture can advantageously be employed as such without previously effecting separation between the trihydrocarbonborane and the solvent. Suitable solvents are: ethers, especially dimethyl ether of diethylene glycol, dimethyl ether of triethylene glycol, and tetrahydrofuran; acetone; benzene; methanol; ethanol; butyl alcohol; carbon tetrachloride; pentane; hexane; hexene; pentene; cyclohexane; and the like.

The carbon monoxide employed in the instant process should be essentially pure to avoid competing side reactions which lowers the yield of the end product. The most undesirable contaminant is free oxygen which will react independently with the trihydrocarbonborane. To minimize the presence of oxygen in the system, the reaction can be conducted under an inert gas blanket. Suitable inert gases are nitrogen, hydrogen, helium, neon, argon, krypton, xenon, gaseous aliphatic hydrocarbons, and the like. For example, after charging the reaction vessel with the trihydrocarbonborane and the deaerated water, the free space above the liquid level can be evacuated and then purged with an inert gas to insure the complete removal of oxygen from the system. Or, it is possible to purge the reactor immediately after injecting carbon monoxide therein by merely bleeding from the reactor carbon monoxide as mixed with the air existing in the free space above the liquid level.

The pressure involved in the process for preparation of these unique borinic acids is not critical. Pressures ranging from a low vaccum to superatmospheric can be employed. However, atmospheric pressure or greater is preferred since such pressures minimize the reaction period and hence enhance the commercial attractiveness of the present process. Additionally, it has been found that when employing pressures exceeding 500 pounds per square inch, higher yields and product purity are realized. These beneficial results are accentuated particularly when working within a pressure range of from about 1000 to about 2500 pounds per square inch. The maximum pressure does not appear to be particularly important to the functioning of the present process. Rather it involves primarily matters of reaction equipment and expediency.

The time required to prepare the compounds of this invention is also not critical, being primarily influenced by the pressure employed. Generally speaking, the compounds of this invention can be produced in high yield within a reaction time of less than 12 hours. A preferred time range, particularly when operating within the preferred pressure range disclosed above, is from about 1 to about 8 hours. In any instance, the reaction time can be reduced by heating the reactants during the reaction period. However, it is preferred to conduct the reaction at approximately room temperature since higher temperatures promote isomerization of the end product.

The compounds of this invention are highly suitable for the preparation of alcohols and ketones of a wide variety heretofore difficult to make by conventional methods if not at all unobtainable. Such alcohols and ketones are useful as intermediaries for further preparation of synthetic lubricants, plasticizers, and solvents.

The unique compounds and the best method I believe for their preparation are not intended to be confined to the examples presented hereinabove but rather to the scope of my invention as embraced in the appended claims.

I claim:

1. Alpha-hydroxyborinic acids having the formula

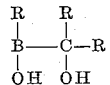

wherein the groups designated by R are hydrocarbon radicals individually containing up to about 18 carbon atoms.

2. The composition of claim 1 further characterized in that said groups designated by R are identical.

3. The composition of claim 1 further charatcerized in that said groups designated by R are alkyl groups.

4. The composition of claim 1 further characterized in that said groups designated by R are identical alkyl groups.

5. Ethyl(3-hydroxy-3-pentyl)borinic acid.

6. 2 - methylpropyl(4 - hydroxy-2,6-dimethyl-4-heptyl) borinic acid.

7. n-Hexyl(7-hydroxy-7-tridecyl)borinic acid.

8. Cyclohexyl (dicyclohexylhydroxymethyl) borinic acid.

9. A process for the preparation of alpha-hydroxyborinic acids comprising reacting a trihydrocarbonborane in which each hydrocarbon group contains up to about 18 carbon atoms with carbon monoxide in the presence of water.

10. The process of claim 9 further characterized in that said trihydrocarbonborane is a trialkylborane.

11. The process of claim 9 further characterized in that said trihydrocarbonborane is a trialkylborane in which the alkyl groups are identical.

12. The process of claim 9 further characterized in that said reaction is conducted at a pressure greater than 500 pounds per square inch.

References Cited by the Examiner

UNITED STATES PATENTS 2,312,208   2/1943   Clayton _____ 260—500 X

CHARLES B. PARKER, *Primary Examiner.*

LEON ZITVER, JOSEPH R. LIBERMAN, LORRAINE A. WEINBERGER, *Examiners.*

D. P. CLARKE, JOSEPH P. BRUST,
*Assistant Examiners.*